US008005912B2

(12) United States Patent
Pearce et al.

(10) Patent No.: US 8,005,912 B2
(45) Date of Patent: Aug. 23, 2011

(54) SYSTEM AND METHOD FOR PRESENCE NOTIFICATION FOR VIDEO PROJECTION STATUS

(75) Inventors: Christopher E. Pearce, Dallas, TX (US); Randall B. Baird, Austin, TX (US); Fadi R. Jabbour, Sunnyvale, CA (US); Joseph F. Khouri, San Jose, CA (US); Labhesh Patel, San Francisco, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1079 days.

(21) Appl. No.: 11/356,896

(22) Filed: Feb. 17, 2006

(65) Prior Publication Data

US 2007/0208812 A1    Sep. 6, 2007

(51) Int. Cl.
*G06F 15/16*      (2006.01)
(52) U.S. Cl. .................... 709/207; 709/205; 709/224
(58) Field of Classification Search .......... 709/204–207, 709/224
See application file for complete search history.

(56) References Cited

U.S. PATENT DOCUMENTS

| | | | |
|---|---|---|---|
| 6,640,230 B1 * | 10/2003 | Alexander et al. ..................... | 1/1 |
| 6,757,722 B2 * | 6/2004 | Lonnfors et al. .............. | 709/220 |
| 7,519,672 B2 * | 4/2009 | Boss et al. .................... | 709/206 |
| 2003/0149724 A1 | 8/2003 | Chang ........................... | 709/204 |
| 2004/0003042 A1 | 1/2004 | Horvitz et al. ................ | 709/204 |
| 2004/0010808 A1 * | 1/2004 | deCarmo ...................... | 725/139 |
| 2004/0015610 A1 * | 1/2004 | Treadwell ..................... | 709/246 |
| 2004/0133638 A1 * | 7/2004 | Doss et al. .................... | 709/203 |
| 2004/0143633 A1 * | 7/2004 | McCarty ....................... | 709/206 |
| 2005/0044143 A1 | 2/2005 | Zimmermann et al. ...... | 709/204 |
| 2005/0080848 A1 | 4/2005 | Shah ............................. | 709/204 |
| 2006/0026288 A1 * | 2/2006 | Acharya et al. ............... | 709/227 |
| 2006/0168007 A1 * | 7/2006 | Peters ........................... | 709/206 |
| 2006/0210034 A1 * | 9/2006 | Beadle et al. .............. | 379/88.22 |

OTHER PUBLICATIONS

H. Schulzrine et al., "RPID: Rich Presence Extensions to the Presence Information Data Format (PIDF)" *Internet Engineering Task Force (IETF)*, http://wwwl.ietf.org/internet-drafts/draft-ietf-simple-rpid-10.txt, 2005, 38 pages, 2005.

* cited by examiner

*Primary Examiner* — Faruk Hamza
(74) *Attorney, Agent, or Firm* — Baker Botts L.L.P.

(57) ABSTRACT

In accordance with one embodiment of the present invention, a method is provided for communicating a presence notification to an end-point of a demand-based messaging system. The method includes monitoring an auxiliary output port for a video signal; detecting a video signal on the auxiliary output port; and reporting a video projection status to the end-point. In additional or alternative embodiments of the method, the method may include receiving a message from the end-point and blocking the message from being displayed on the auxiliary output port. In yet another additional or alternative embodiment of the method, the method may include sending a message to the end-point indicating that the message has been blocked.

15 Claims, 1 Drawing Sheet

SYSTEM AND METHOD FOR PRESENCE NOTIFICATION FOR VIDEO PROJECTION STATUS

TECHNICAL FIELD OF THE INVENTION

This invention relates in general to demand-based messaging systems, and more particularly to providing a presence notification for a user projecting video.

BACKGROUND OF THE INVENTION

The popularity of demand-based messaging systems, including instant messaging (IM) systems, has exploded in recent years. The utility of IM systems certainly has not gone unnoticed in the corporate world, either. Today, organizations routinely use IM systems to facilitate communications between employees and other members of the organization. The popularity of IM systems, though, increases the risk that users will inadvertently disclose confidential or personal information to unintended recipients. This risk is particularly acute when an IM user is using an IM-enabled computer to project video to an audience. A computer typically projects everything that is displayed on the computer screen; thus, messages received during such a presentation also are typically projected. Obviously, such a scenario can be problematic and potentially embarrassing to a recipient that receives a message containing confidential or personal information while projecting video to an audience.

SUMMARY OF THE INVENTION

In accordance with some of the teachings of the present invention, the disadvantages and problems associated with using an IM system while projecting video have been substantially reduced or eliminated.

In accordance with one embodiment of the present invention, a method is provided for communicating a presence notification to an end-point of a demand-based messaging system. The method includes monitoring an auxiliary output port for a video signal; detecting a video signal on the auxiliary output port; and reporting a video projection status to the end-point of the demand-based messaging system. In additional or alternative embodiments of the method, the method may include receiving a message from an endpoint and blocking the message from being displayed on the auxiliary output port. In yet another additional or alternative embodiment of the method, the method may include sending a message to the end-point indicating that the message has been blocked.

In accordance with another embodiment of the present invention, a computer system is provided for communicating a presence notification to an end-point of a demand-based messaging system. The computer system includes a memory having an encoded method for monitoring an auxiliary output port for a video signal; detecting a video signal on the auxiliary output port; and reporting a video projection status to the end-point of the demand-based messaging system. In additional or alternative embodiments of the computer system, the method may include receiving a message from the end-point and blocking the message from being displayed on the auxiliary output port. In yet another additional or alternative embodiment of the computer system, the method may include sending a message to the end-point indicating that the message has been blocked.

Important technical advantages of certain embodiments of the present invention include automatically detecting a video signal on an auxiliary port of a computer and setting a presence status notifying other users that the computer is projecting video.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
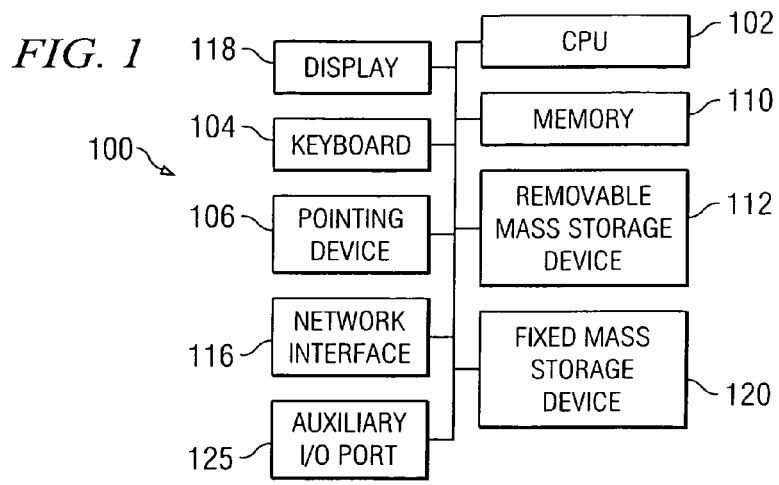
FIG. 1 is a block diagram of a general purpose computer system for processing data in accordance with one embodiment of the present invention.

FIG. 1 is a block diagram of a general purpose computer system 100 for executing processing in accordance with one embodiment of the present invention. Other computer system architectures and configurations can be used for carrying out the processing of the present invention. Computer system 100, made up of various subsystems described below, includes at least one central processing unit (CPU) 102. CPU 102 can be implemented by a single-chip processor or by multiple processors. CPU 102 is a general purpose digital processor that controls the operation of the computer system 100. Using instructions retrieved from memory 110, the CPU 102 controls the reception and manipulation of input data, and, further, the output and display of data on output devices.

CPU 102 is coupled bi-directionally with memory 110, which can include a first primary storage [typically a random access memory (RAM)] and a second primary storage area [typically a read-only memory (ROM)]. Primary storage can be used as a general storage area and as scratch-pad memory, and can also be used to store input data and processed data. It can also store programming instructions and data, in the form of data objects and text objects, in addition to other data and instructions for processes operating on CPU 102. Also, primary storage typically includes basic operating instructions, program code, data, and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. One common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g., RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, tablet, or any other element that is useful for interacting with a graphical user interface.

The network interface 116 allows CPU 102 to be coupled to another computer, computer network, or telecommunications network using a network connection as shown. Through the network interface 116, it is contemplated that the CPU 102 might receive information (e.g., data objects or program instructions from another network), or it might output information to another network in the course of performing the above-described operation. Information, often represented as a sequence of instructions to be executed on a CPU, may be received from and outputted to another network, for example, in the form of a computer data signal embodied in a carrier wave. The origin or destination of such a computer data signal is referred to generally herein as an "end-point." An interface card or similar device and appropriate software implemented by CPU 102 can be used to connect the computer system 100 to an external network and transfer data according to standard protocols. That is, method embodiments of the present invention may be executed solely upon CPU 102, or they may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O port 125 can be used in conjunction with computer system 100. The auxiliary I/O port 125 can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers. With respect to the present invention, auxiliary I/O port 125 typically is an auxiliary output port attached to an external display device, such as a video projector.

In addition, embodiments of the present invention further relate to computer program products that contain program code for performing various computer-implemented operations. The program code generally is encoded in a computer-readable medium, which is any data storage device that can store data and thereafter be read by a computer system. The media and program code may be those specially designed and constructed for the purposes of the present invention. Examples of computer-readable media include, but are not limited to, all the media mentioned above; magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Moreover, embodiments related to computer program products may be implemented in and executed from any local (embedded or attached) or remote device that is capable of monitoring auxiliary video I/O port 125. Examples of program code include both machine code, as produced, for example, by a compiler, or files containing higher level code that may be executed using an interpreter.

In general, the above described hardware and software elements are of standard design and construction. Other computer systems suitable for use with the invention may include additional or fewer subsystems. In addition, bus 114 is illustrative of any interconnection scheme serving to link the subsystems. The computer system shown in FIG. 1 is but one example of a computer system suitable for use with the invention. Other computer architectures having different configurations of subsystems also may be utilized.

In conjunction with certain embodiments of the present invention described below, one or more computer systems interact with an IM system. Typically, the IM system uses a network interface, such as network interface 116, to exchange messages, presence notifications, and other data between end-points.

Figure 2:
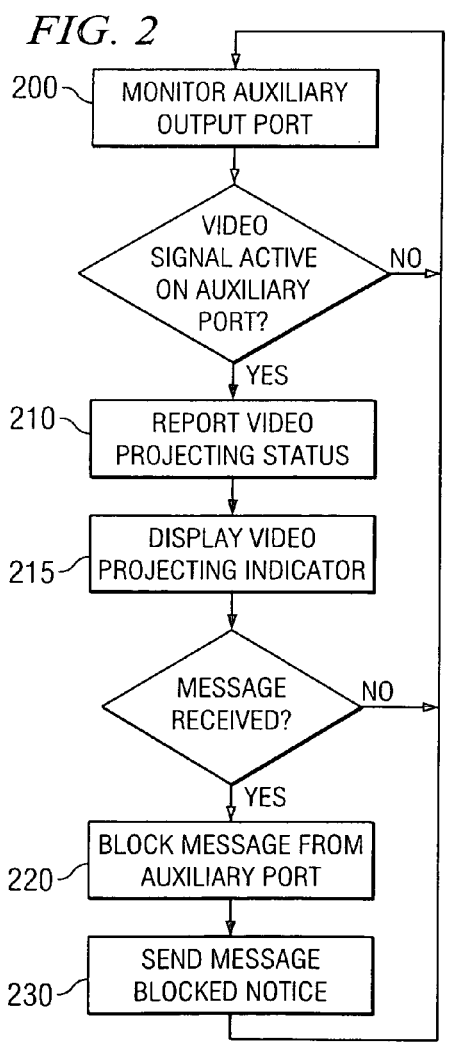
FIG. 2 is a flow diagram of an example operation of the present invention.
Figure 3:
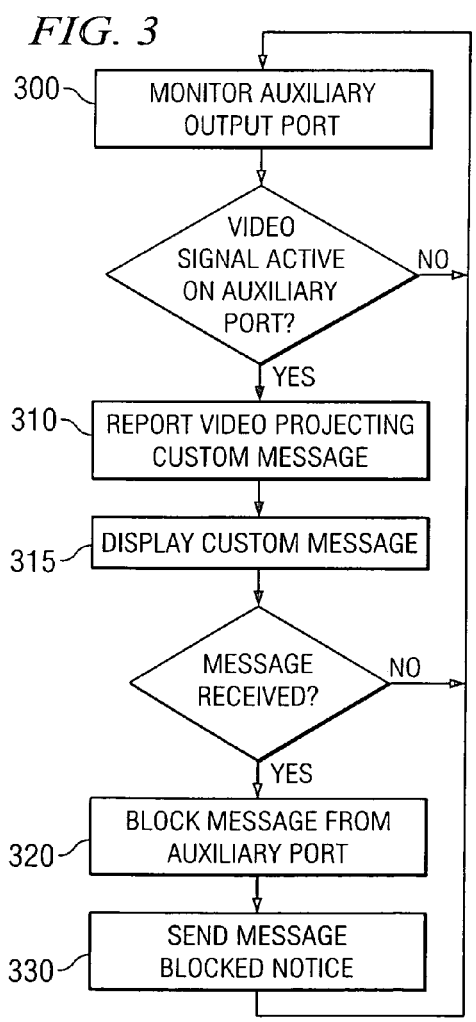
FIG. 3 is a flow diagram of an example operation of the present invention.

FIG. 2 and FIG. 3 are flow diagrams illustrating certain operations of the present invention. Note that the flow diagrams disclosed herein are merely examples of an embodiment according to the present invention. It should be noted that the same or similar objectives can be achieved in various manners, for example, the order of many of the steps shown in the flow diagram can be reorganized and yet achieve the same objective.

FIG. 2 is a flow diagram of a certain operation of the present invention for providing a video projection status to end-points of an improved instant messaging system. As noted above, an end-point represents the origin or destination in the instant messaging system. In the context of this description, an end-point may represent a hardware component, a software component, or an end-user. As illustrated in FIG. 2, auxiliary output port 125 is monitored continuously (step 200). The present invention may be configured to detect various end-point configurations that, in conjunction with a video signal on auxiliary port 125, indicate that the end-point is in a video projection mode. For instance, a laptop computer often uses the auxiliary port to connect to a larger monitor. Such a use of the auxiliary port likely does not necessitate a video projecting status for the endpoint. In such a configuration, the internal display may often be disabled or used to display different data than that displayed on the larger monitor. In contrast, if the internal display is configured to display the same data that is displayed through the auxiliary port, then it is likely that the end-point is in a video projection mode. Moreover, some end-points may have an internal video projection function that explicitly configures the end-point for projecting. The present invention likewise may be configured to detect such explicit configurations. Finally, some software applications provide application-level controls for configuring an end-point for projection, and the present invention also may be configured to detect such application-level controls. If, according to a certain prescribed configuration, it is determined that an end-point is in a video projection mode, then a video projecting status is transmitted through network interface 116 to the IM system (step 210). Improved IM clients (in communication with the IM system) can then display an icon or other status indicator reflecting the video projection status (step 215). If an instant message is received through network interface 116, the message may optionally be blocked from display through auxiliary output port 125 (step 220) and, optionally, a message may be sent to the sender notifying the sender that the message was blocked (step 230).

FIG. 3 is a flow diagram of another example operation of the present invention for providing a video projection status to users of a conventional instant messaging system. As illustrated in FIG. 3, auxiliary output port 125 is monitored continuously (step 300). If a video signal is detected on auxiliary port 125, then a custom video projecting message is transmitted through network interface 116 to the IM system (step 310). IM clients (in communication with the IM system) can then display the custom video projection message, reflecting the video projection status (step 315). If an instant message is received through network interface 116, the message may optionally be blocked from display through auxiliary output port 125 (step 320) and, optionally, a message may be sent to the sender notifying the sender that the message was blocked (step 330).

Many conventional IM clients are capable of displaying custom messages alongside standard status icons. Accordingly, a significant advantage of the embodiment illustrated in FIG. 3 is its compatibility with conventional IM clients, while allowing improved IM clients to use supplementary information included in a custom video projection message. More specifically, this embodiment enables a user that is projecting to leverage the automatic detection features of the present invention and transmit this information to other users, even if the other users have not upgraded to an improved IM client that also implements the features of the present invention.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

Certain novel aspects of the present invention also may be combined with other techniques of communicating supplemental presence information. For example, one embodiment of the present invention may monitor auxiliary output port 125 and insert a privacy element as an extension to the standard Presence Information Data format (commonly referred to as PIDF). IM users having extension-enabled IM clients then would be able to discern another end-point's video projection status based on the privacy element.

What is claimed is:

1. A method for providing a presence notification to an end-point of a demand-based messaging system, the method comprising:
    monitoring, by a central processing unit (CPU), an auxiliary output port;
    determining, by the CPU, that the end-point is in a video projection mode by:
        detecting that the end-point has been configured for projection by an internal video projection function;
        determining that the end-point is in the video projection mode because the end-point has been configured for projection;
    reporting, by the CPU, independently of an instant message, a video projection status that the end-point is in the video projection mode to one or more messaging system clients, the video projection status reported by inserting a privacy element as an extension to a message;
    after reporting the video projection status, blocking an instant message sent by a sender; and
    notifying the sender that the instant message was blocked.

2. The method of claim 1, wherein determining that the end-point is in a video projection mode comprises:
    determining that an internal display is configured to display the same data as the auxiliary output port.

3. The method of claim 1, wherein determining that the end-point is in a video projection mode comprises:
    detecting activation of an internal video projecting function that configures the auxiliary output port for projecting.

4. The method of claim 1, wherein determining that the end-point is in a video projection mode comprises:
    detecting activation of an application-level control that configures the auxiliary output port for projecting.

5. An apparatus for providing a presence notification to an end-point of a demand-based messaging system, the apparatus comprising:
    a memory; and
    one or more processors configured to:
        determine that the end-point is in a video projection mode by:
            detecting that the end-point has been configured for projection by an internal video projection function;
            determining that the end-point is in the video projection mode because the end-point has been configured for projection;
        report, independently of an instant message, a video projecting status that the end-point is in the video projection mode to one or more messaging system clients, the video projection status reported by inserting a privacy element as an extension to a message;
        after reporting the video projection status, block an instant message sent by a sender; and
        notify the sender that the instant message was blocked.

6. The apparatus of claim 5, the one or more processors configured to:
    report the video projecting status through a network interface component.

7. The apparatus of claim 5, the one or more processors configured to:
    report the video projecting status as a privacy element in a Presence Information Data Format message.

8. The apparatus of claim 5, the one or more processors configured to:
    receive the instant message through a network interface component; and
    block the instant message from being displayed through an auxiliary output port.

9. The apparatus of claim 5, wherein the one or more processors determine that the end-point is in a video projection mode by:
    determining that an internal display is configured to display the same data as the auxiliary output port.

10. The apparatus of claim 5, wherein the one or more processors determine that the end-point is in a video projection mode by:
    detecting activation of an internal video projecting function that configures the auxiliary output port for projecting.

11. The apparatus of claim 5, wherein the one or more processors determine that the end-point is in a video projection mode by:
    detecting activation of an application-level control that configures the auxiliary output port for projecting.

12. One or more non-transitory computer readable storage media storing software for providing a presence notification to an end-point of a demand-based messaging system, the software comprising code such that when executed is configured to:

monitor an auxiliary output port;

determine that the end-point is in a video projection mode by:

detecting that the end-point has been configured for projection by an internal video projection function;

determining that the end-point is in the video projection mode because the end-point has been configured for projection;

report, independently of an instant message, a video projection status that the end-point is in the video projection mode to one or more messaging system clients, the video projection status reported by inserting a privacy element as an extension to a message;

after reporting the video projection status, block an instant message sent by a sender; and notify the sender that the instant message was blocked.

13. The computer readable storage media of claim 12, wherein the code is configured to determine that the end-point is in a video projection mode by:

determining that an internal display is configured to display the same data as the auxiliary output port.

14. The computer readable storage media of claim 12, wherein the code is configured to determine that the end-point is in a video projection mode by:

detecting activation of an internal video projecting function that configures the auxiliary output port for projecting.

15. The computer readable storage media of claim 12, wherein the code is configured to determine that the end-point is in a video projection mode by:

detecting activation of an application-level control that configures the auxiliary output port for projecting.

* * * * *